(12) United States Patent
Delfatti, Jr. et al.

(10) Patent No.: US 8,874,817 B2
(45) Date of Patent: Oct. 28, 2014

(54) SYSTEM FOR OUT OF BAND MANAGEMENT OF RACK-MOUNTED FIELD REPLACEABLE UNITS

(75) Inventors: Daniel J. Delfatti, Jr., Half Moon Bay, CA (US); Mark E. Meyer, Scotts Valley, CA (US); Jesse Lawrendra, San Jose, CA (US); Thomas Giles, Union City, CA (US)

(73) Assignee: Oracle International Corporation, Redwood City, CA (US)

( * ) Notice: Subject to any disclaimer, the term of this patent is extended or adjusted under 35 U.S.C. 154(b) by 182 days.

(21) Appl. No.: 13/368,528

(22) Filed: Feb. 8, 2012

(65) Prior Publication Data

US 2013/0205069 A1  Aug. 8, 2013

(51) Int. Cl.
*H05K 7/10* (2006.01)
*G06F 13/40* (2006.01)

(52) U.S. Cl.
CPC ................................ *G06F 13/4081* (2013.01)
USPC ........................................................ 710/302

(58) Field of Classification Search
None
See application file for complete search history.

(56) References Cited

U.S. PATENT DOCUMENTS

| | | | |
|---|---|---|---|
| 6,192,434 B1 | 2/2001 | Wallach et al. | |
| 6,970,948 B2 | 11/2005 | Brown et al. | |
| 6,978,319 B1 * | 12/2005 | Rostoker et al. | 709/250 |
| 7,558,849 B2 | 7/2009 | Chandwani et al. | |
| 7,652,889 B2 | 1/2010 | Larson et al. | |
| 7,761,687 B2 | 7/2010 | Blumrich et al. | |
| 7,856,488 B2 | 12/2010 | Cripe et al. | |
| 8,601,463 B2 | 12/2013 | Bouchier et al. | |
| 8,639,466 B2 | 1/2014 | Cashman et al. | |
| 2002/0016897 A1 * | 2/2002 | Nerl | 711/170 |
| 2005/0138473 A1 | 6/2005 | Mathew et al. | |
| 2005/0261026 A1 * | 11/2005 | Hausman et al. | 455/559 |
| 2006/0179184 A1 * | 8/2006 | Fields et al. | 710/36 |
| 2007/0174075 A1 * | 7/2007 | Franke et al. | 705/1 |
| 2007/0234130 A1 * | 10/2007 | Sullivan et al. | 714/43 |
| 2009/0189774 A1 | 7/2009 | Brundridge et al. | |
| 2009/0206670 A1 | 8/2009 | Whitted et al. | |
| 2009/0282142 A1 | 11/2009 | Tamura et al. | |
| 2010/0042852 A1 * | 2/2010 | Yin et al. | 713/300 |
| 2010/0083252 A1 * | 4/2010 | Eide et al. | 718/100 |
| 2011/0093572 A1 | 4/2011 | Koehler et al. | |
| 2012/0047404 A1 * | 2/2012 | Peng | 714/48 |
| 2012/0185637 A1 * | 7/2012 | Boecker et al. | 711/103 |
| 2012/0331119 A1 | 12/2012 | Bose et al. | |

* cited by examiner

*Primary Examiner* — Henry Tsai
*Assistant Examiner* — Aurangzeb Hassan
(74) *Attorney, Agent, or Firm* — Marsh Fischmann & Breyfogle LLP; Jonathan A. Szumny

(57) ABSTRACT

A system for the management of rack-mounted field replaceable units (FRUs) that affords the enhanced availability and serviceability of FRUs provided by blade-based systems but in a manner that accommodates different types of FRUs (e.g., in relation to form factors, functionality, and the like) installed within a rack or cabinet.

20 Claims, 8 Drawing Sheets

SYSTEM FOR OUT OF BAND MANAGEMENT OF RACK-MOUNTED FIELD REPLACEABLE UNITS

RELATED APPLICATIONS

This application is related to the following U.S. Patent Application which is filed concurrently with this Application and which is incorporated herein by reference to the extent permitted by law:

Ser. No. 13/368,482, entitled "MANAGEMENT RECORD SPECIFICATION FOR MANAGEMENT OF FIELD REPLACEABLE UNITS INSTALLED WITHIN COMPUTING CABINETS."

BACKGROUND

1. Field of the Invention

The present invention generally relates to the management of field replaceable units (FRUs) mounted within a frame structure such as a rack or cabinet and, more specifically, to systems and methods that bring the enhanced availability and serviceability of blade or chassis-based computing systems into rack-based computing systems.

2. Relevant Background

There has been significant progress made in recent years in using Intelligent Platform Management Interface (IPMI) for "out of band" (OOB) management (e.g., presence detection such as FRU discovery, inventory audit, activation such as power-cycle and CPU reset, etc.) in both rack mounted server (RMS) and blade compute systems. IPMI is an industry standard, computer system technology providing an architecture or protocol that facilitates communication between a system controller or manager (e.g., including management software) and one or more unique devices being managed.

Computing cabinets or racks are standardized frames that are designed to hold a plurality of computing devices or related components (e.g., rack-mounted servers, power distribution units or backup devices, and/or other types of FRUs). Generally, rack systems include a number of vertical rails or posts (e.g., two, four) to which FRUs can be secured. Various types and sizes of FRUs may be installed within a rack system and often have standardized heights as multiples of one rack unit (U). For instance, industry standard rack systems often come in heights of 18 U, 22 U, 36 U, 42 U, and the like. In high availability environments, the set of FRUs (e.g., computing devices, related components, and the like) in a frame configuration are administered as a single compute system that is functionally consistent with administration of a single FRU.

More recently, FRUs such as blade servers are being used that are typically installed within a compartment or structure referred to as a "blade enclosure" or chassis (e.g., where the blade servers and chasses or enclosure are collectively called a "blade system"). The blade enclosure includes a midplane into which all of the blade servers are interconnected and provides many non-core computing services to installed blade servers such as power, cooling, networking, interconnects, management, and the like. That is, the installed blade servers collectively share such non-core computing services provided by the blade enclosure. For instance, a blade enclosure may have a system controller or manager including any appropriate control software or logic that functions to intelligently adjust liquid cooling systems to meet the cooling requirements of the blade servers. Also, the system controller facilitates the ability to "hot-swap" blades within the enclosure (i.e., the ability to add, remove and replace units at need without having to power-off the enclosure). The Advanced Telecommunications Computing Architecture (ATCA) is an open industry standard including a series of specifications targeted to requirements for blades and chasses (e.g., in relation to form factors and the like).

SUMMARY

Blade systems advantageously provide almost 100% uptime or availability due to use of a unified management service, redundancy or availability (e.g., upon a first blade server going down, a second blade server can take over and maintain the system without interruption to other blade servers until the first blade server is replaced), rapid fault isolation, low mean time to repair, midplane management paths to components, fixed FRU locations and configurations, reductions in cabling, power, and size requirements, and the like. However, blade enclosures and the installed blade servers are generally proprietary designs. That is, a particular blade enclosure is typically designed to accept only a particular type of blade server such that all of the blade servers installed within a blade enclosure have the same form factors, connectors, and the like. Thus, the above-discussed benefits and advantages of blade systems are inherently limited to a common type of FRU installed within a proprietary blade enclosure.

The inventors have determined that it would be desirable to bring many of the benefits of blade or chassis-based computing systems (such as the above-discussed enhanced availability and serviceability) into rack-based systems. Stated differently, the inventors have determined that it would be desirable to provide the ability to seamlessly provide out of band (e.g., lights out) management (e.g., in relation to rebooting, shutdown, power-on, fan speeds, power and cooling monitoring, hot-swapping, and the like) of what may be numerous disparate FRUs within a rack-based system.

In this regard, disclosed herein is a system or frame for the management of rack-mounted FRUs that affords the enhanced availability and serviceability of FRUs provided by blade-based systems but in a manner that accommodates different types of FRUs (e.g., in relation to form factors, functionality, and the like) installed within a rack or cabinet (e.g., server or open compute equipment rack, cabinet or assembly for holding a plurality of pieces of computing equipment). Broadly, the disclosed system includes a plurality of "frame arms" (e.g., receiving structures, housings, connectors, and/or the like) for receiving and interconnecting with a corresponding plurality of FRUs (e.g., having similar or disparate form factors and functionalities), a "frame center" (e.g., a separate, dedicated computing device, such as a central management server, which may also be a FRU) that functions as or is in communication with (e.g., via one or more communication paths) a "frame manager" (e.g., via associated management logic), and a "fixed interconnect topology" (e.g., wired and/or wireless) interconnecting the frame center to each of the frame arms that allows the frame manager to determine the physical or fixed locations of installed FRUs in the rack (e.g., even among a plurality of disparate FRUs) for use in conducting out of band management of the FRUs. In this regard, the fixed interconnect topology and frame arms may essentially function as a backplane or midplane of the system. The system may be incorporated into a rack as part of building the rack or else be retrofitted or otherwise integrated into an existing rack. The system and rack may collectively be referred to as a "setup."

The frame manager may communicate with OOB service processors of each of the FRUs (e.g., built-in system management tools each including one or more dedicated processors and memory modules, such as Oracle's Integrated Lights-Out Managers (ILOMs)) via the fixed interconnect topology as part of performing OOB management. The system may incorporate a unified management system (UMS) made up various piece of logic or software executed by the frame center and the various FRU OOB service processors. For instance, installing a FRU into the frame (e.g., interconnecting the FRU with a particular frame arm) may cause a portion of the UMS to be automatically downloaded onto the FRU for use by the FRU's OOB service processor as part of communicating with the frame manager. In this regard, installing a FRU into the frame allows the FRU to substantially automatically and seamlessly join its appropriate management service context (e.g., UMS).

In one arrangement, the fixed interconnect topology may include: at least one wired or wireless communication path (e.g., I²C connection(s)) between each frame arm and the frame center for out of band management communications between a FRU's OOB service processor and the frame manager, and at least one power line (e.g., power cable) interconnected between each frame arm and the frame center for delivering power to each of the FRUs. To facilitate installation and hot-swapping of FRUs, each frame arm may include a blind-mate or other appropriate type of connector to which the various paths and channels may be interconnected. Similarly, the power jacks, network ports, and the like of each FRU may be interconnected to a corresponding blind-mate or other type of connector that may be appropriately positioned on the FRU so as to align with and interconnect with a frame arm's connector upon installation of the FRU into the frame.

As an example, imagine a FRU is installed into the frame so that the above-described connector of the FRU interconnects with a corresponding connector of a particular frame arm. Upon detecting that power has been drawn (or in other appropriate manner(s), such as receiving a communication), the frame manager establishes a connection with the OOB service processor of the FRU via the corresponding network communication path to perform one or more out of band management tasks with respect to the newly installed FRU. For instance, the frame manager may maintain or at least have access to various types of information in relation to minimum processing and storage capacities of installed FRUs, power and cooling requirements, physical locations, current firmware version, network connections, and the like.

In this regard, part of the OOB management performed by the frame manager may include obtaining one or more properties from the OOB service processor of a newly installed FRU and comparing such properties to minimum or expected properties. Upon the frame manager determining that the FRU includes the expected properties or otherwise validating the FRU, the frame manager may then instruct the main processor on the motherboard of the FRU to power up so that the FRU can proceed to operate in any appropriate manner. Thereafter, the UMS portion on the OOB service processor of the FRU may send alerts or messages to the frame manager via the communications path(s) as appropriate in relation to faults, requests to remove the FRU from the frame, and the like. Among other advantages, a rack or cabinet including the disclosed frame or system installed therein may hold data center floor space for later, rapid deployment of various types of FRUs (e.g., in response to service demand, roll-out of new services, and/or the like).

In one aspect, a system for use with hot-pluggable, FRUs includes a plurality of receiving structures for interfacing with a corresponding number of FRUs, where each receiving structure is in a fixed location within the system, where a first of the receiving structures is adapted to interface with a first FRU of a first type, where a second of the receiving structures is adapted to interface with a second FRU of a second type, and where the first type is different than the second type. The system also includes a central management server for performing OOB management of FRUs interfaced within the system, and a fixed interconnect topology interconnecting the central management server to the plurality of receiving structures. The fixed interconnect topology includes at least one path interconnecting each receiving structure to the central management server, where the central management server obtains data corresponding to the fixed location of each interfaced FRU by way of the at least one path of a corresponding receiving structure, and where the central management server utilizes the fixed location data of the interfaced FRUs to perform the OOB management of the interfaced FRUs via the fixed interconnect topology.

In another aspect, a setup is disclosed that includes a cabinet having width, height, and depth dimensions; a plurality of receiving structures situated along the height dimension of the cabinet, each having a first connector; a central management server fixed to the cabinet; and a harness of communication paths interconnecting the central management server to the first connectors. The harness of communication paths includes at least one power cable interconnected between the central management server and each first connector, and at least one network communication path or cable interconnected between the central management server and each first connector. The central management server performs out of band management of field replaceable units (FRUs) interfaced with the first connectors via the harness of communication paths.

In another aspect, a method includes ascertaining, by a central management server interconnected to a computing cabinet, that at least a first field replaceable unit (FRU) has been installed on a first of a plurality of receiving structures interconnected to the computing cabinet; establishing a connection with an OOB service processor of the first FRU via a fixed interconnect topology, where the fixed interconnect topology interconnects the central management server to each of the plurality of receiving structures; obtaining, from the OOB service processor of the first FRU, one or more properties of the first FRU; evaluating the first FRU properties in relation to one or more expected properties of FRUs installed at the first receiving structure, where the expected properties are stored in a management record portion of a memory of the central management server; and taking, by the central management server, at least one action based on a result of the evaluating.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 1 illustrates one embodiment of a setup including a smart computing frame or system installed within a computing rack for facilitating out of band management of a plurality of FRUs within the rack, such as rack-mounted servers, backup power modules, and/or the like.

DETAILED DESCRIPTION

Disclosed herein are systems and methods for the collective management of rack-mounted FRUs (e.g., servers, backup power modules, and/or the like) that provide levels of availability and serviceability similar to those provided within chassis or blade-based systems. Broadly, the disclosed system includes a plurality of "frame arms" (e.g., receiving structures, housings, connectors, and/or the like) for receiving and interconnecting with a corresponding plurality of FRUs (e.g., having similar or disparate form factors and functionalities). For instance, adjacent frame arms may be appropriately spaced along the height or other dimension of a computing rack or cabinet (e.g., such as by 1 U or multiples thereof) and may be conveniently aligned with slide rails and/or other mounting features so that a FRU inserted into the rack via the slide rails or other mounting features may be operable to automatically interconnect with a respective frame arm.

The disclosed system also includes a "frame center" (e.g., a separate, dedicated computing device, such as a central management server) that may function as a "frame manager" of installed FRUs (e.g., via associated management logic, such as UMS) along with a "fixed interconnect topology" (e.g., wired and/or wireless) interconnecting the frame center to each of the frame arms that allows the frame manager to determine the physical locations of installed FRUs for use in conducting OOB management of the FRUs (e.g., start-up, hot-swapping, power and cooling monitoring, and/or the like). The system (including the frame arms, frame center, and fixed interconnect topology) may be incorporated into the rack or cabinet as part of building the same or else be retrofitted or otherwise integrated into an existing rack or cabinet (i.e., an existing rack or cabinet that has not been purpose-built specifically for the system). That is, the rack/cabinet and FRUs may be standalone products that are independent of the system. The combination of the system/frame and a rack or cabinet may collectively form a "setup."

Figure 1:
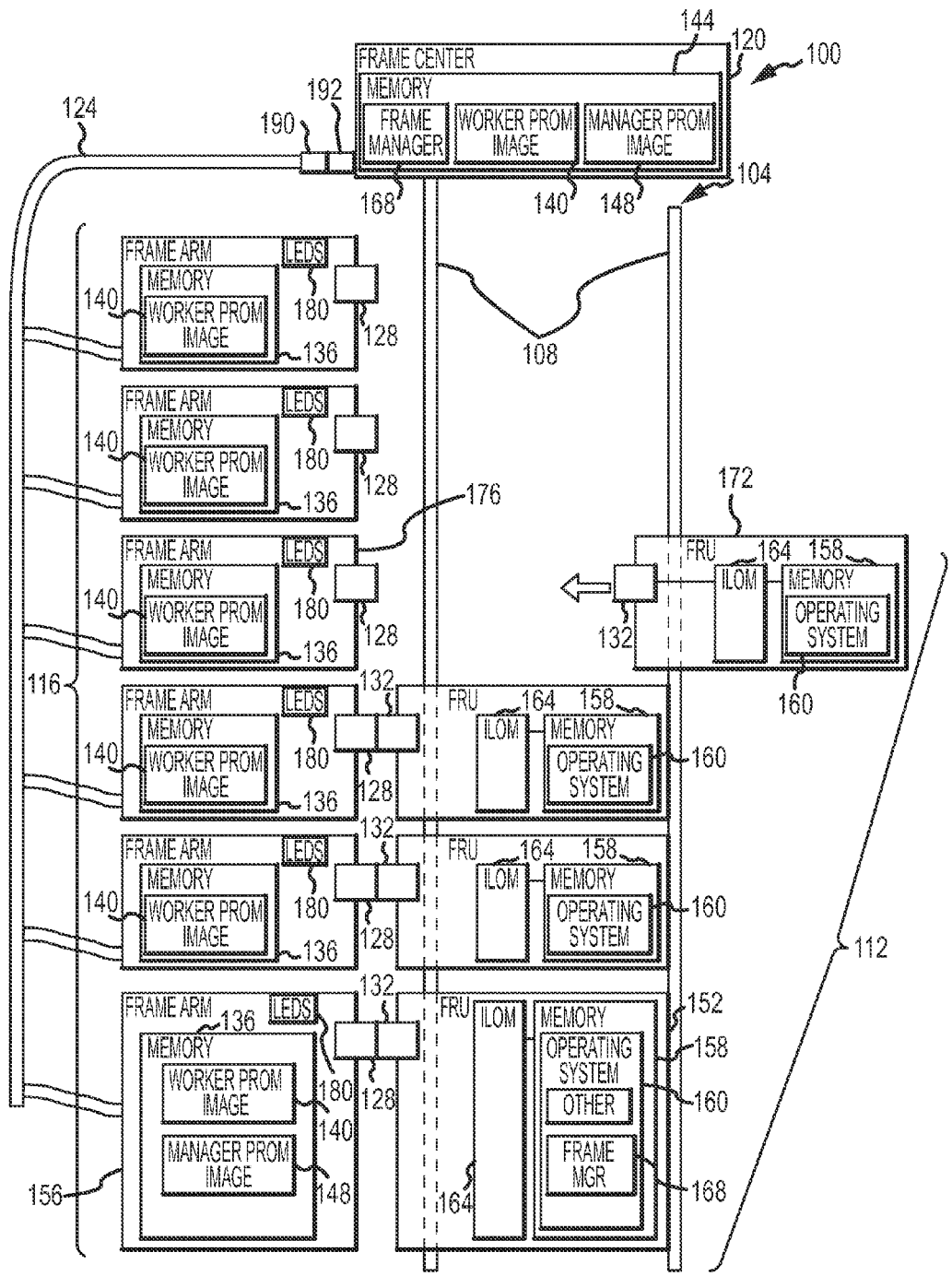

As used herein, the term "fixed interconnect topology" connotes a plurality of communication paths/lines (e.g., those necessary for OOB management) and/or power paths/lines fixedly connecting the frame center to each of the plurality of frame arms that broadly allows for determination of the fixed location of a particular frame arm (and thus a FRU interfaced with the frame arm) within the frame. More specifically, each path or line includes two endpoints, where the first endpoint (e.g., endpoint "A") is connected to a particular port of the frame center and the second endpoint (e.g., endpoint "B") is connected to a particular frame arm (e.g., where the frame arm is at an offset U within the frame). Turning now to FIG. 1, a schematic diagram of a computing frame or system 100 is disclosed that allows rack-type FRUs (e.g., rack-mount servers, backup power modules, and the like) to be managed in a manner similar to that in which blade-type servers are managed within a blade enclosure or chassis, but in a manner that is largely free of many of the inherent limitations of blade-type systems. The frame 100 may be secured to any appropriate rack or cabinet 104 having a plurality of bays or receiving locations (not shown) sized to receive a plurality of FRUs 112 of one or more types and/or form factors such as rack-mount servers, blade enclosures (each holding one or more blade servers), and/or other computing devices in a stacked or overlapping fashion. The cabinet 104 may include any appropriate number of posts or vertical support members or rails 108 (e.g., two, four, and the like) based upon the particular environment in which the frame 100 is to be implemented. Associated with the posts 108 may be a series of slide rails or other structures (not shown) that allow the FRUs 112 to be selectively inserted into and secured to the cabinet 104. The posts 108 may be appropriately secured to the floor or other adjacent building structure to limit the frame 100 from falling over. Other details concerning the cabinet 104 (e.g., panels, fasteners, and the like), how the FRUs 112 are inserted into and removed from the cabinet 104, and the like will not be further discussed in the interest of clarity and/or brevity.

The frame 100 includes a plurality of frame arms or receiving structures 116 for interconnecting and/or interfacing with a corresponding plurality of the FRUs 112 in addition to a frame center 120 (e.g., a separate, dedicated computing device) running a frame manager 168 (e.g., software, logic) that operates to perform OOB management of the FRUs 112. While the frame manager 168 has been illustrated as being disposed within the frame center 120, some arrangements envision that the frame manager 168 may be running on a device separate from the frame center 120 (e.g., an installed FRU 112, a device separate from the frame center 120 and installed FRUs 112, and/or the like).

In any case, the frame 100 also includes a fixed interconnect topology 124 that directly interconnects the frame center 120 to each of the frame arms 116. The fixed interconnect topology 124 may be any arrangement of fixed power and communication channels or paths between each frame arm 116 and the frame center 120. That is, the fixed interconnect topology 124 includes at least one power path or line (e.g., cable) extending from each frame arm 116 to the frame center 120 that routes power from the frame center 120 to the frame arm 116, and at least one communication path (e.g., an I²C connection) between each frame arm 116 and the frame center 120 that facilitates communications between the frame center 120 and the frame arm 116. For instance, each line may be in the form of "line-endpoint(A):management-server(X): port(N)<->line-endpoint(B):receive-structure(U)."

In one arrangement, the fixed interconnect topology 124 may be in the form of a harness of wires or cables fixed between the frame center 120 and the various frame arms 116. In another arrangement, the fixed interconnect topology 124 may include wireless communication paths between the frame center 120 and each of the frame arms 116 (e.g., via any appropriate wireless components resident on the frame center 120 and the frame arms 116). In a further arrangement, the fixed interconnect topology 124 may additionally include general purpose input/output (GPIO) wires and/or controls for visual or other types of indicators (e.g., LEDs) on the frame arms 116 (discussed in more detail below). In any event, the fixed interconnect topology 124 may essentially function as a "virtual" backplane or midplane that allows a FRU 112 to automatically be able to join whatever management service context they are part of (in this case, the UMS running on the frame manager 168 and OOB service processors 164 of installed FRUs 112).

Each frame arm or receiving structure 116 generally connotes any appropriate arrangement of one or more parts or components that function to interface with a corresponding FRU 112 (e.g., so as to establish at least one power connection and at least one communication connection between the frame arm 116 and an interfaced FRU 112) and thereby electrically interconnect the FRU 112 to the frame center 120. In one arrangement, each frame arm 116 may include a bracket or circuit board (not labeled) fixed or fixable to any appropriate portion of the cabinet 104 and to which corresponding portions of the fixed interconnect topology 124 (i.e., the respective power and communication lines) may be mounted or secured. Each frame arm 116 may also include a connector 128 (e.g., blind-mate connector) to which the respective power and communication lines may be interconnected and which is operable to interface with a corresponding connector 132 of a corresponding FRU 112. As an example, each frame arm 116 may be appropriately mounted or otherwise disposed behind a corresponding bay of the cabinet 104 so that, upon insertion of a FRU 112 into a bay, the connector 132 of the FRU 112 may be inserted into or otherwise able to interface with the connector 128 of a corresponding frame arm 116.

For instance, one or more power lines (e.g., wires, cables, not shown) may extend between power ports of the FRU 112 (e.g., DC power ports, not shown) and the connector 132 of the FRU 112 (e.g., via a circuit board). Similarly, one or more communication lines (e.g., cables, not shown) may extend between communication ports of the FRU (e.g., serial and/or network management ports, not shown) 112 and the connector 132 of the FRU 112 (e.g., via a circuit board). In this regard, interfacing the connectors 128, 132 (e.g., as part of installing a FRU 112 into the cabinet 104) establishes power and communication connections between a FRU 112 and the frame center 120. In one arrangement, the bracket or circuit board of each frame arm 116 may include circuitry (not shown) that is operable to convert information received from a FRU 112 via the connectors 132, 128 into I²C signaling protocol, and information received from the frame center 120 via the fixed interconnect topology 124 back into serial management or other appropriate protocol.

The frame 100 persistently stores information sufficient to allow a connected/interfaced FRU 112 and the frame center 120 to agree on the FRU's 112 physical location within the frame (e.g., in relation to an offset U). Such persistently stored information may be resident within the frame arms 116, the frame center 120, the fixed interconnect topology 124, and/or other appropriate location. For instance, the frame center 120 may maintain a fixed list of all lines/paths of the fixed interconnect topology 124 in the form of "line-endpoint(A):management-server(X):port(N)<->line-endpoint(B):receive-structure(U)."

In any event, the frame manager 168 utilizes the fixed interconnect topology 124 and the frame arms 116 to readily perform OOB management of the FRUs 112 (e.g., regardless of the manufacturer of the FRU 112, the form factors of the FRU 112, and the like). That is, the frame 100 allows the frame manager 168 to substantially seamlessly perform OOB management of what may be numerous disparate types of FRUs 112 installed within the cabinet 104 (e.g., in relation to product type, motherboard revision, processor configuration, memory configuration, PCI root and leaf node configuration, and/or the like) but similar to the manner in which the system controller of a blade chassis manages individual blades. With knowledge of the physical or fixed locations of FRUs 112 within the frame 100, the frame manager 168 can readily pass communications and requests to and between the FRUs 112; administrators can readily swap out or otherwise rectify malfunctioning FRUs 112 so as to maintain high levels of uptime, redundant fault architectures, and low mean time to repair; and the like.

In one arrangement, the fixed interconnect topology 124 may include a smart or intelligent cable extending between each frame arm 116 and the frame center 120. Each such smart cable may include a memory storing any appropriate serial number or other identification data that may be read by the frame manager 168 (and a corresponding installed FRU 112) to determine a fixed or physical location of a frame arm 116 and thus the FRU 112. For instance, the frame manager 168 may maintain or at least have access to a table of frame arm locations and corresponding smart cable serial numbers. Upon receiving a communication (e.g., via I²C protocol) over one of the smart cables and reading the corresponding serial number, the frame manager 168 may utilize the table to determine which frame arm 116 (and thus which FRU 112) the communication originated from; this may be useful to isolate faulty FRUs, administer start-ups or reboots, and/or the like.

In another arrangement, the frame manager 168 may be able to monitor for power draws to determine frame arm 116 and corresponding FRU 112 locations. For instance, upon the connector 132 of a FRU 112 being interfaced with a corresponding connector 128 of a particular frame arm 116, the frame manager 168 may be designed to detect the resultant draw in power by the FRU 112 and thereby determine the FRU's 112 fixed or physical location within the frame 100.

In another arrangement, a framework of management record specifications stored within programmable read-only memory (PROM) images at the frame center 120 and the frame arms 116 may be provided and accessed by the frame manager 168 to determine locations of frame arms 116 and corresponding FRUs 112, administer management policies corresponding to particular FRUs 112, and the like. Before discussing the management record specification framework in more detail, a few brief examples of OOB management in the frame 100 will be provided.

As one example, imagine a FRU 112 is installed into the frame 100 so that its connector 132 interconnects with a corresponding connector 128 of a particular frame arm 116. Upon determining that the FRU 112 has been installed in the frame 100 (e.g., by detecting a power draw), the frame manager 168 may establish a connection with an OOB service processor 164 of the FRU 112 over the corresponding communication path (e.g., via I²C protocol) and determine whether or not the FRU 112 meets any specified minimum processing requirements and/or storage capacity, any particular motherboard revision number, and/or the like (which may be policy driven). Upon determining that the FRU 112 has not met one or more minimum requirements, the frame manger 168 may disallow the FRU 112 from joining the management service context of the frame 100 (which may either allow the FRU 112 to proceed normally, that is, as if the FRU 112 was not part of the frame 100; or, not allow the FRU's 112 main processor to even power up). However, upon validating the FRU 112, the frame manager 168 may instruct the main processor on the motherboard of the FRU 112 to power up so that the FRU can proceed to operate as part of the management service context of the frame 100 (discussed more fully below).

As another example, the frame manager 168 may monitor for alerts or messages received from installed FRUs 112 and take appropriate actions. For instance, upon an installed FRU 112 experiencing one or more fault conditions, the FRU's 112 OOB service processor 164 may send an alert or other message indicative of the fault condition(s) to the frame manager 168 whereupon the frame manager 168 may take any appropriate remedial action (e.g., attempting to rectify the fault, sending an alert to an administrator indicating the location in the frame 100 of the faulty FRU 112, and the like). As a further example, imagine that an administrator desired to hot-swap one or more FRUs 112 within the frame 100. For instance, the administrator may be required to depress a button or take other appropriate action indicating the desire to institute the hot-swap. The frame manager 168 may receive a hot-swap request message from the particular frame arm 116 and determine whether hot-swapping of the corresponding FRU 112 is allowed. For instance, the frame manager 168 may maintain a table of hot-swapping policies (or other management policies) for the various frame arms 116 and/or corresponding FRUs 112. Upon determining that hot-swapping of FRUs 112 installed in the particular frame arm 116 is allowed, the frame manager 168 may proceed to allow the hot-swap (e.g., via illuminating an LED 180 of a particular color on the frame arm 116). Numerous other examples of out of band management by the frame manager 168 are envisioned and encompassed within the scope of the present disclosure.

As discussed previously, another manner of determining frame arm 116 and FRU 112 locations within the frame 100 and administering management policies may be by way of a management record specification framework. As will be discussed, the disclosed management record specification may be implemented within a "manager" PROM image stored at the frame center 120 and that may be accessed by the frame manager 168 as part of managing installed FRUs 112, as well as within a plurality of "worker" PROM images stored at the frame arms 116 and that may be accessed by installed FRUs 112 to determine frame roles, physical locations, and the like. Generally, installing a FRU 112 into a frame arm 116 causes the OOB service processor 164 of the FRU 112 to access records (e.g., location records) in a worker PROM image of the frame arm 116 to initially determine whether the FRU 112 is installed in the frame 100 as opposed to another type of enclosure. Assuming the OOB service processor 164 is able to read the location records of the worker PROM image, it then obtains information that both defines its location within the frame 100 as well as its role within the frame (e.g., whether the FRU is to function as merely a "worker" FRU, is to take some sort of managerial role within the frame 100, and/or the like). Additionally, the frame manager 168 obtains information from the manager PROM image to understand how to manage each of the various FRUs 112 (e.g., in relation to hot-swapping, propagating firmware updates, and the like) and causes updates to the manager PROM image to include records corresponding to newly installed FRUs 112. As product and configuration changes generally only require modification to the manager PROM image as opposed to the plurality of worker PROM images, the disclosed management record specification can advantageously remain largely static across different frame configurations to reduce management overhead.

With continued reference to FIG. 1, each frame arm 116 may include a memory 136 (e.g., a PROM) storing at least one corresponding "worker" PROM image 140. Each worker PROM image 140 includes information records that may broadly be used by a FRU 112 to determine whether the FRU 112 is installed in the frame 100 (i.e., as opposed to another type of rack or cabinet), determine the FRU's 112 location within the frame 100, determine a particular "role" that the FRU 112 is to assume within the frame 100, allow the FRU 112 to obtain one or more IP addresses for communicating with a frame manager, and the like (discussed below). Further, the frame center 120 may include a memory 144 storing at least one manager PROM image 148 that broadly includes information necessary to define the frame 100 (e.g., in relation to frame arm locations, configurations, power and cooling requirements, and the like) and which can be used by the frame manager 168 to perform OOB management of FRUs 112, route incoming and outgoing communications between frame arms 116, and the like. The memory 144 of the frame center 120 also stores a corresponding worker PROM image 140 that can be used by the frame center 120 to determine its location within the frame 100, determine that it is to be a frame manager, determine IP addresses of FRUs for routing management communications, and/or the like. To facilitate the reader's understanding of how the FRUs 112, frame arms 116, and the frame center 120 interact within the frame 100 to provide the aforementioned increased levels of availability and serviceability, additional reference will now be made to FIG. 2 which illustrates a method 200 for use with the frame 100 as well as FIGS. 3-4 which illustrate schematic diagrams of the worker and manager PROM images 140, 148 for use within the frame 100.

The method 200 may include interfacing 204 a FRU 112 with a frame arm 116 of the frame 100. For instance, the interfacing 204 may entail inserting a first FRU 152 into a particular bay of the cabinet 104 so that the connector 132 of the first FRU 152 interfaces or otherwise interconnects with a connector 128 of a first frame arm 156 (see FIG. 1). The method 200 may then include attempting 208 (e.g., by the OOB service processor 164 of the first FRU 152) to read a location record of the worker PROM image 140 of the first frame arm 156. With brief reference to FIG. 3, the worker PROM 140 includes a location record 304 and a subnet IP record 324. The location record 304 may include one or more unique location IDs that serve to identify a geographic address or location of the frame arm 116 in which the worker PROM image 140 is stored, e.g., to identify a geographic address or location of a corresponding FRU 112. For instance, the location record 304 may include a "physical" location ID 308 that identifies a location within the frame 100 of a FRU 112 that is directly or physically interconnected to the connector 128 of a corresponding frame arm 116 (e.g., a FRU 112 connected to frame arm 116 #2 could have a corresponding physical location ID 308 of "2" while a FRU 112 connected to frame arm 116 #6 could have a corresponding physical location ID 308 of "6"). In one arrangement, the physical location ID 308 may provide a particular offset U (e.g., offset rack unit number) within the frame 100.

Figure 5:
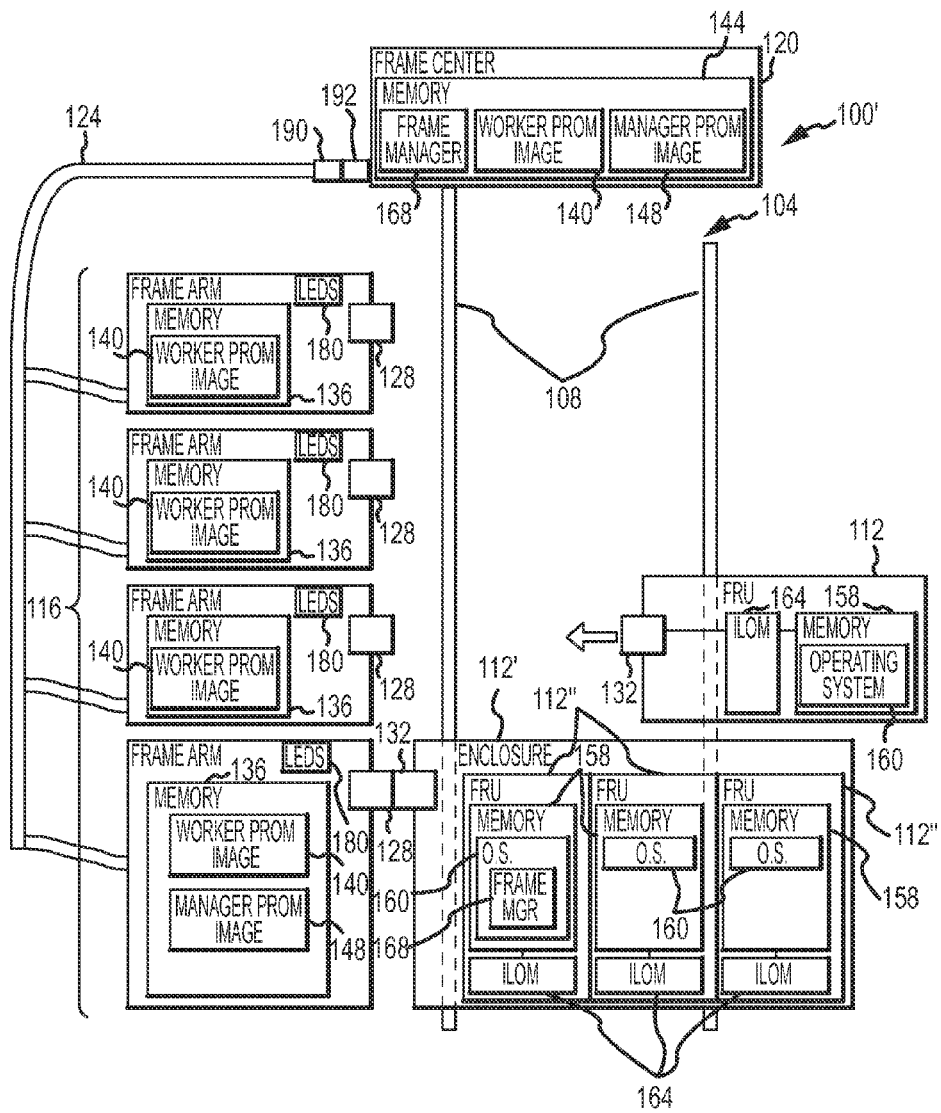
FIG. 5 illustrates another embodiment of the smart computing frame of FIG. 1.

The location record 304 may also include one or more "non-physical" location IDs 312 each of which identifies a location of at least one FRU 112 that is indirectly interconnected to a corresponding frame arm 116 via another FRU 112 that is directly interconnected to the frame arm 116. For instance, FIG. 5 illustrates another embodiment of the frame 100' in which the connector 132 of a FRU 112' in the form of a blade enclosure is interfaced with the connector 128 of a corresponding frame arm 116. The FRU 112' includes a plurality FRUs 112" in the form of blade servers appropriately mounted within the FRU 112'. In this case, the location record 304 of the corresponding worker PROM image 140 may include a physical location ID 308 that identifies a location of the FRU 112' within the frame 100' as well as a plurality of non-physical IDs 312 that identify locations within the frame 100' of the plurality of FRUs 112". For instance, a chassis management module (CMM)(not shown) of an Oracle Sun Netra 6000 chassis (e.g., FRU 112') connected to a frame arm 116 #8 may be identified by a physical location ID 308 of "8" and the OOB service processor 164 of a blade server (e.g., FRU 112") disposed within a "slot #3" of the chassis may be identified by a non-physical location ID 312 of "131" (0x83).

When the location record 304 of a particular worker PROM image 140 includes one or more non-physical location IDs 312, the location record 304 may also include a subordinate location ID list 316 that maps or otherwise links the non-physical location IDs 312 (i.e., IDs that identify the FRUs 112" relative to the frame 100) to local device numbers 320 (i.e., IDs that identify the FRUs 112" relative to the FRU 112') and which may be used by the FRU 112' to configure the FRUs 112" in a manner free of having to wait for communication with the frame manager 168. The location record 304 may also include an "identification" byte 332 that identifies a role of the FRU 112 within the frame (e.g., role as the frame manager, role as a worker FRU, and the like). For instance, the identification byte 332 of the worker PROM image 140 of the frame center 120 may be set to a "frame manager" role so that upon installation of the frame center 120 into the frame 100, the frame center 120 proceeds to function as the frame manager (e.g., via the frame manager 168).

The subnet IP record 316 includes a base management subnet IP address 328 that broadly provides the OOB service processor 164 of each FRU 112 with the information it needs to communicate with the frame center 120, frame manager 168, and/or other FRUs 112. More specifically, individual addresses (e.g., of other FRUs 112) may be derived by using the subnet IP address 328 as the network address and the physical or non-physical location ID 308, 312 as the host address.

Referring back to FIGS. 1-2, the attempting to read step 208 of the method 200 may include an OOB service processor 164 of the first FRU 152 attempting to read the physical and/or non-physical location IDs 308, 312 of the location record 304 of the worker PROM image 140. Thereafter, the method 200 may determine 212 whether the location record 304 can be read. Responsive to a negative determination at 212, the method 200 may proceed to 216 where the first FRU 152 may be operated in a "normal" mode (e.g., a mode of operation that is free of association with the management service context of the frame 100). Responsive to a positive determination at 212, the method 200 may proceed to 220 at which point the first FRU 152 may be operated in a "smart frame" mode (e.g., a mode of operation that is at least partially controlled or dictated by the management service context of the frame 100). Part of the result of a positive determination at 212 may be the frame manager 168 instructing the main processor(s) on the first FRU 152 to power up.

Figure 2:
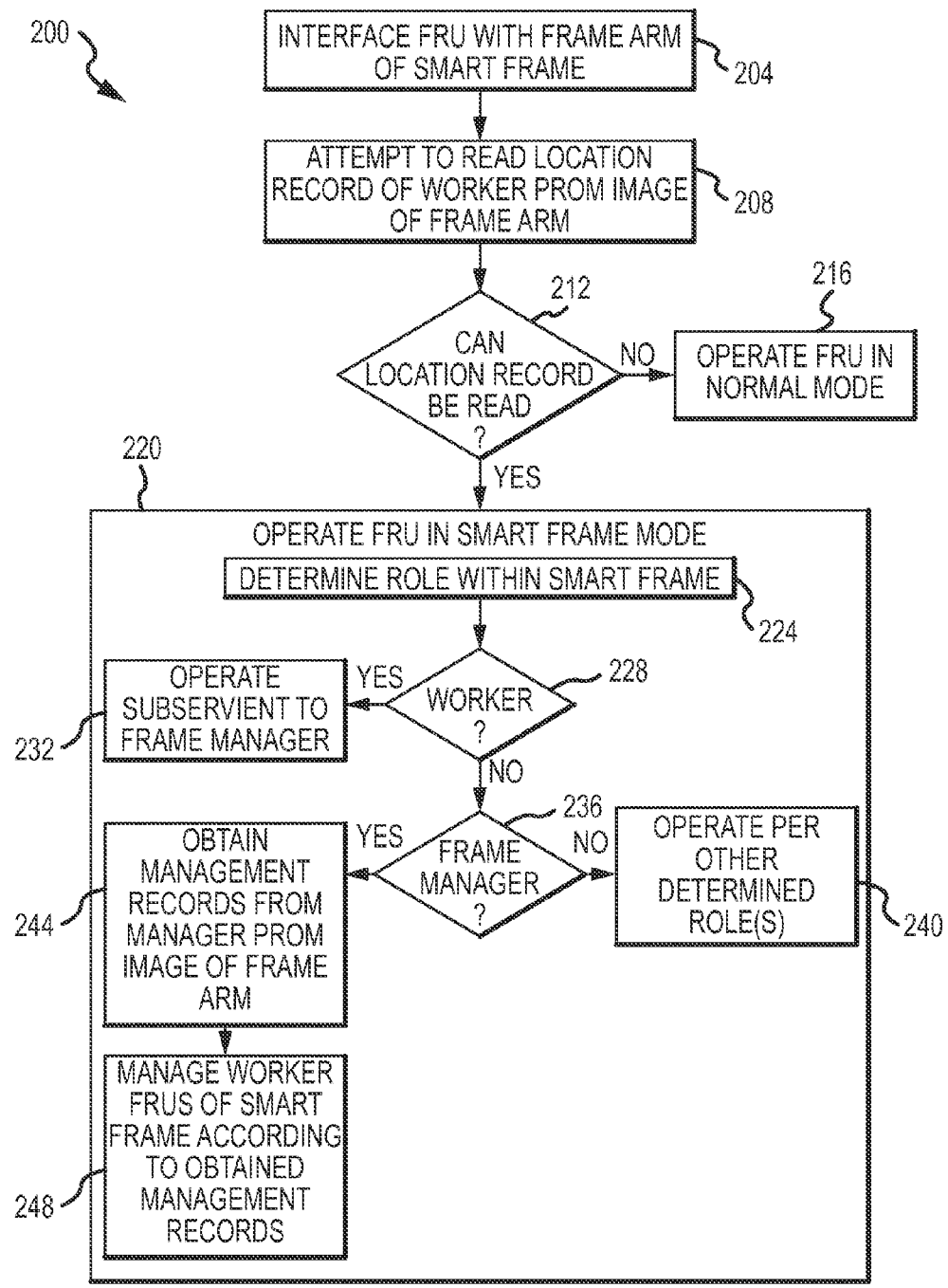
FIG. 2 is a flow diagram of a method for use of worker and manager PROM images stored in the frame of FIG. 1 to manage FRUs of a smart computing frame.
Figure 3:
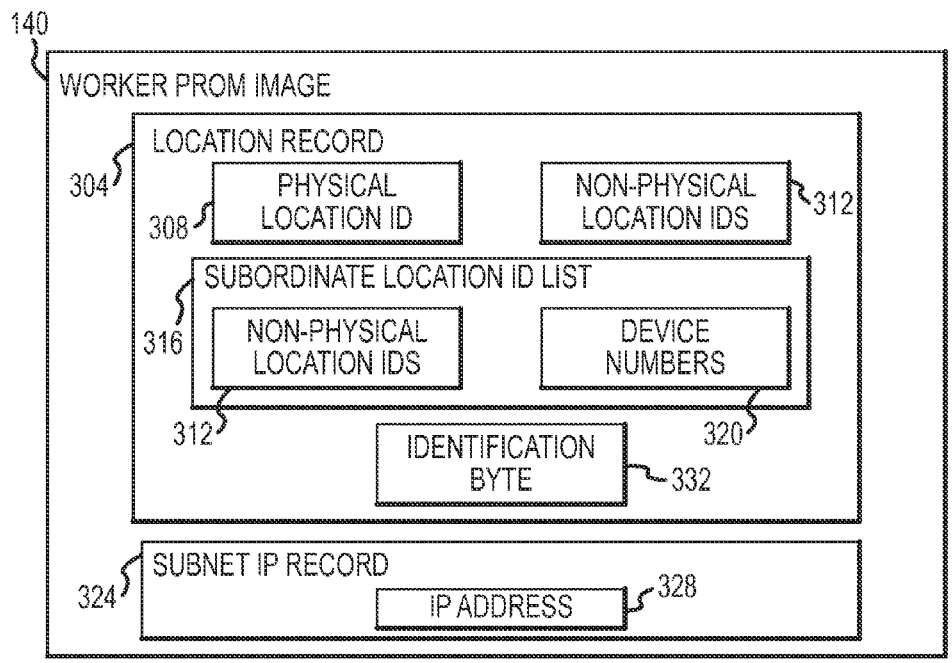
FIG. 3 is a schematic diagram of a worker PROM image of the frame of FIG. 1.

As shown in FIG. 2, the operation 220 of the first FRU 152 in smart frame mode may include determining 224 a role of the first FRU 152 within the frame 100, such as via the OOB service processor 164 reading and interpreting a bit mask of the identification byte 332 of the worker PROM image 140. For instance, responsive to a positive determination to a query 228 as to whether the role is a worker FRU, the method 200 may proceed to 232 where the first FRU 152 may be operated 232 in a manner that is generally subservient to the frame manager 168 (e.g., in a manner in which the first FRU 152 is managed by the frame manager 168). Responsive to a negative determination to the query 228, the method 200 may proceed to query 236 whether the determined role is a frame manager. More specifically, while the frame manager 168 has generally been described and illustrated as being run by the frame center 120, this is not always necessarily the case.

For instance, the bit mask of the identification the first FRUs 152 byte 332 of worker PROM image may indicate the role of the frame manager. Upon determining such a role, the method 200 may proceed to obtain 244 management records from a manager PROM image 148 of the first frame arm 156 and then manage 248 worker FRUs (and possible additional FRUs) of the frame 100 according to the obtained management records (e.g., via a frame manager 168 running on the first FRU 152). For instance, upon initial configuration of the frame 100 and/or at any other appropriate time, an administrator or other user may load or otherwise store the manager PROM image into the memory 136 of a selected frame arm 116 (in addition to setting the bit mask of the identification byte 332 of the worker PROM image 140 of the selected frame arm 116 to correspond to a frame manager role). In one arrangement, each FRU 112 may store a copy of the frame manager 168 in the memory 158 that it may run upon determining that it has a frame manager role. In another arrangement, a FRU 112 may, upon determining that it has a frame manager role, obtain a copy of the frame manager 168 from any appropriate location (e.g., another FRU 112, the frame center 120, higher level components, and the like) via communication channels 124 for storage in memory 158 and subsequent execution. FRUs may also operate 240 according to other various types of roles which are encompassed within the scope of the present disclosure.

Figure 4:
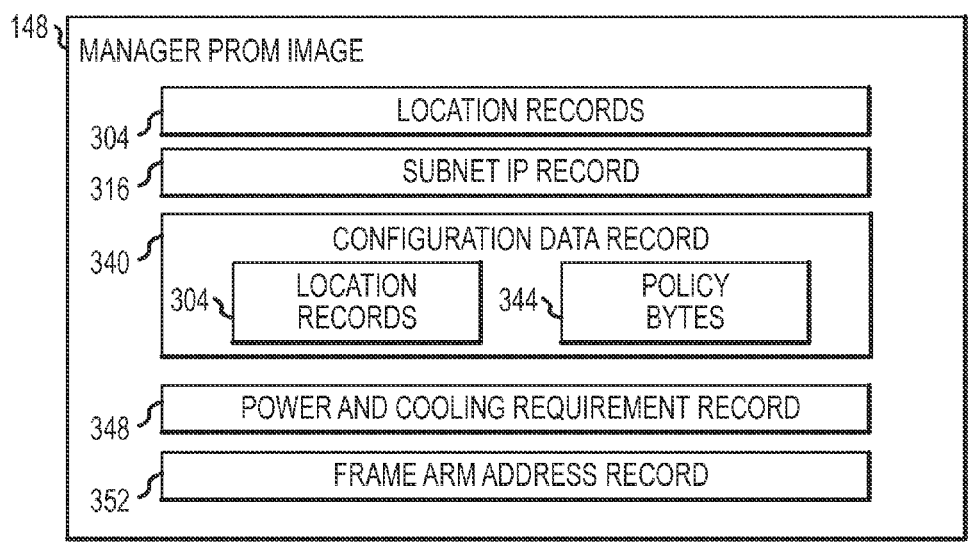
FIG. 4 is a schematic diagram of a manager PROM image of the frame of FIG. 1.

In any case, the frame manager 168 utilizes the manager PROM image 148 information as part of managing the FRUs 112 of the frame 100. Turning now to FIG. 4, the manager PROM image 148 includes the location records 304 of all of the worker PROM images 140 associated with installed FRUs 112 and the frame center 120 as well as the subnet IP record 324. In this regard, the frame manager 168 can derive individual addresses of each of the installed FRUs 112 and the frame center 120 using the location records 304 and subnet IP record 316 for use in communications between the same. The manager PROM image 148 may also includes a configuration data record 340, power and cooling requirement records 348, and frame arm address records 352.

The configuration data record 340 generally stores configuration information specific to FRUs 112 installed at particular frame arms 116 in the frame 100. As shown, the configuration data record 340 may generally store the configuration information by way of a plurality of "policy" bytes 344 that are tagged with specific location records 304 (e.g., with specific physical location IDs 308). For instance, the configuration data record 340 may include a "hot-swap" policy byte 344 having a particular bit mask for each of the location IDs 308 indicating whether hot-swapping of a FRU 112 associated with the location ID 308 is disabled, activated, deactivated, and the like. As another example, the configuration data record 340 may include a "firmware" policy byte 344 specifying whether a FRU's 112 firmware, upon joining the frame manager's 168 configuration, is to be checked to determine whether the firmware is of a particular version, must be automatically upgraded, does not need to be checked, and the like. Numerous other types of policy bytes 344 are envisioned such as a "memory size" byte 344 (e.g., specifying minimum required available memory in an installed FRU 112 of a particular frame arm 116 as identified by physical location ID 308), an "installed type" byte 344 (e.g., specifying one or more particular types of FRUs that can be installed at a particular frame arm 116 as identified by physical location ID 308), a "network connections" byte 344 (e.g., specifying one or more particular types of network connections that an installed FRU 112 needs to have), and the like.

The configuration data record 340 (as with the other records disclosed herein) may be arranged and organized in any appropriate manner. For instance, the configuration data record 340 may be arranged in a table or database format whereby physical and/or non-physical location IDs 308, 312 may populate a first row or first column, each of the various policy bytes 344 may populate the other of the first row or first column, and bit masks of the various policy bytes 344 may populate cells in the table for each of the location IDs. The frame manager 168 may access the configuration data record 340 as part of managing FRUs 112 installed in the frame 100. In one arrangement, the makeup of the manager PROM image 148 may reflect FRUs 112 currently installed in the frame 100. More specifically, in the event that a frame arm 116 is free of a FRU 112 being directly interfaced therewith, the manager PROM image 148 may also be free of information (e.g., location records 308, policy bytes 344, and the like) specific to the worker PROM image 140 of the frame arm 116 and FRUs 112 to be installed at the frame arm 116. Also, in the event that a FRU 112 is installed in a particular frame arm 116 and joins the frame's management service context or network, the frame manager 168 may facilitate the updating of the manager PROM image 148 to reflect information specific to the frame arm 116 and FRUs 112 installed at the frame arm 116. In another arrangement, the manager PROM image 148 may store information specific to a frame arm 116, policy bytes 344, and the like whether or not a FRU 112 is installed on the frame arm 116.

In relation to different frame configurations, the information stored in the manager PROM image 148 may change (e.g., to account for a new or different configuration) while the information in the worker PROM images 140 may remain largely static. For instance, imagine a first configuration in which half of the frame arms 116 of a frame 100 are populated with FRUs 112, where each of the populated frame arms 116 includes a respective worker PROM image 140. Further imagine a second configuration of the frame 100 in which one or more of the previously non-populated frame arms 116 of the frame 100 are now populated with one or more FRUs 112. Here, while the manager PROM image (e.g., stored in the frame center 120 and/or one of the FRUs 112) may be updated to account for the newly added FRUs 112, each of the worker PROM images 140 corresponding to installed FRUs 112 that are common between the first and second configurations may remain the same. However, it should be understood that when a particular FRU 112 installed in a frame arm 116 is replaced with a different FRU, the information of the worker PROM image 140 (and thus the manager PROM image 148) in the frame arm 116 may in some situations correspondingly change. For instance, in the event that a 2 U FRU 112 installed at one or two frame arms 116 is replaced with a 4 U FRU 112 installed at the same one or two frame arms 116, the location record 304 of the worker PROM image(s) 140 of the frame arm(s) 116 may be appropriately updated to reflect a different "rack location height" (e.g., due to the difference in height between a 2 U FRU and a 4 U FRU).

As an example of how a frame manager 168 manages installed FRUs 112, imagine the first FRU 152 runs the frame manager 168 and that a second FRU 172 (see FIG. 1) is interfaced with a second frame arm 176 of the frame 100. Further assume that the OOB service processor 164 of the second FRU 172 can read the location record 304 of the worker PROM image 140 stored in the second frame arm 176 and determines (e.g., upon reading the identification byte 332) that it is a worker FRU. Upon determining by the frame manager 168 that a worker FRU (i.e., the second FRU 172) has been installed in the frame (e.g., by receiving a message at the frame manager 168 from the OOB service processor 164 of the second FRU 172 via the frame center 120 and communication channels 124, by detecting a related power draw, and/or in other appropriate manners), the frame manager 168 may access the manager PROM image 148 of the first frame arm 156 and obtain management records tagged with the physical location ID 308 of the second frame arm 176 for use in managing the second FRU 172.

For instance, upon the frame manager 168 receiving a request from the OOB service processor 164 of the second FRU 172 to join its network (i.e., the frame's 100 network), the frame manager 168 may query the OOB service processor 164 of the second FRU 172 for various specifications of the second FRU 172, such as current firmware version, available memory, network connections, motherboard revision, product type, PCI root and leaf node configuration, and/or the like. Upon receiving the specifications, the frame manager 168 may analyze or evaluate the received specifications in relation to the particular policy byte bit masks associated with the second frame arm 176 physical location ID 308 and take one or more actions based on a result of the evaluation. As an example, upon the frame manager 168 determining that the second FRU 172 needs to update its current firmware to a newer version, the frame manager 168 may disallow the joining of the second FRU 172 to the frame's network until the second FRU 172 updates its firmware. As another example, upon receiving a request from the OOB service processor 164 of the second FRU 172 to bring one or more applications online (e.g., available for use by other FRUs 112 and/or higher level components or processes), the frame manager 168 may query the OOB service processor 164 for the current network connections of the second FRU 172 (e.g., which switches the second FRU 172 is connected to), and allow or disallow the bringing of the application(s) online based on a result of the network connection query by the frame manager 168.

In one arrangement, the frame center 120 and/or the frame arms 116 may include one or more LEDs 180 (or other indicators) that broadly indicate operational states or statuses of the frame arms 116 to facilitate servicing of the frame 100 (e.g., hot-swapping of FRUs 112, diagnosing fault conditions, and/or the like). The operational states of a particular frame arm 116 may range from an initial state of no FRU 112 being interfaced with the frame arm 116 all the way through to a final state of one or more FRUs 112 being interfaced and active (e.g., all manual servicing of the frame 100 is complete). The LEDs 180 may also indicate proper transition from initial to final state as well as error states that may require additional specific recovery operations.

For instance, a user may, upon desiring to hot-swap the second FRU 172, depress or manipulate a button or other feature (not shown) on the back of the second frame arm 176. Manipulation of the button or other feature causes the transmission of a request to the frame manager 168 (via the fixed interconnect topology 124) to perform a hot-swap operation of the second FRU 172. In response, the frame manager 168 accesses and evaluates the "hot-swapping" policy byte 344 in the configuration data record 340 of the manager PROM image 148 that is tagged with the physical location ID 308 associated with the second frame arm 176 to determine whether or not hot-swapping of the second FRU 172 is allowed, and then correspondingly allows or disallows hot-swapping based on a result of the evaluating. For instance, an LED 180 on the second frame arm 176 may assume respective first and second conditions (e.g., blinking or not blinking) responsive to the frame manager 168 determining that hot-swapping of the second FRU 172 is either allowed or not allowed.

As discussed previously, the frame center 120 is interconnected to each of the frame arms 116 by way of power and communication channels 124 and generally facilitates the routing of communications among installed FRUs 112. In this regard, the frame center 120 accesses the frame arm address record 352 of the manager PROM image 148 to determine how to route a particular communication to a particular frame arm 116 (and thus a FRU 112 installed at the particular frame arm 116). In one arrangement, the frame arm address record 352 may map physical hardware addresses and port numbers to physical location IDs 308. For instance, upon a FRU 112 seeking to bring one or more applications online, the OOB service processor 164 of the FRU 112 may generate a request that includes a destination physical or non-physical location ID 308, 312 associated with the frame manager's FRU 112 and pass the request to the frame center 120. Upon receipt of the request at the frame center 120, the frame center 120 may utilize the destination physical or non-physical location ID 308, 312 to obtain corresponding physical hardware address(es) and port number(s) (e.g., a hardware path) and then route the request to such obtained physical hardware address(es) and port number(s). In one arrangement, the frame center 120 propagates changes to the subnet IP record 316 to the frame arms 116 for updating of the respective worker PROM images 140.

Figure 6:
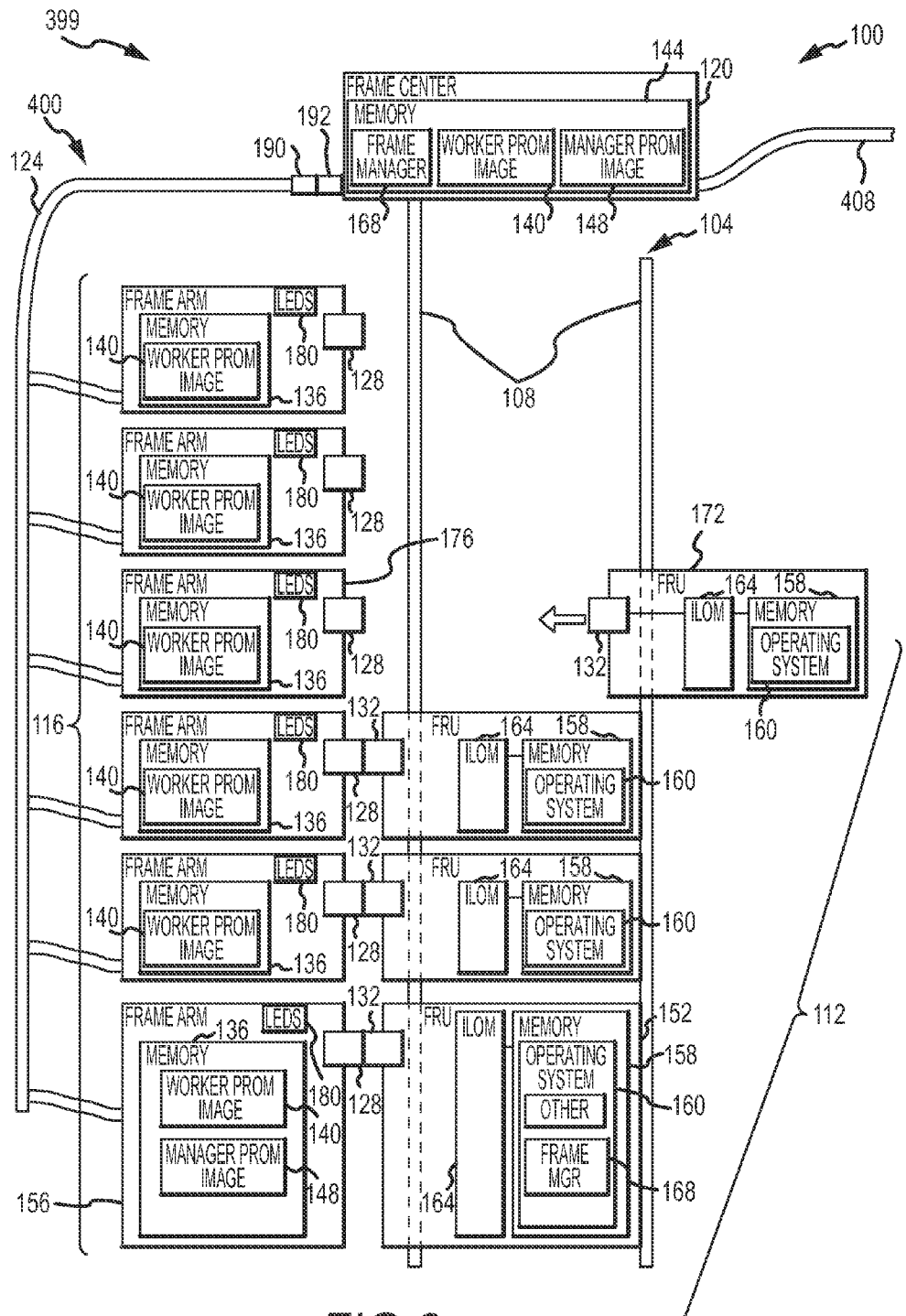
FIG. 6 illustrates another embodiment where at least two of the smart computing frames of FIG. 1 are interconnected to form a smart computing frame system.
Figure 6:
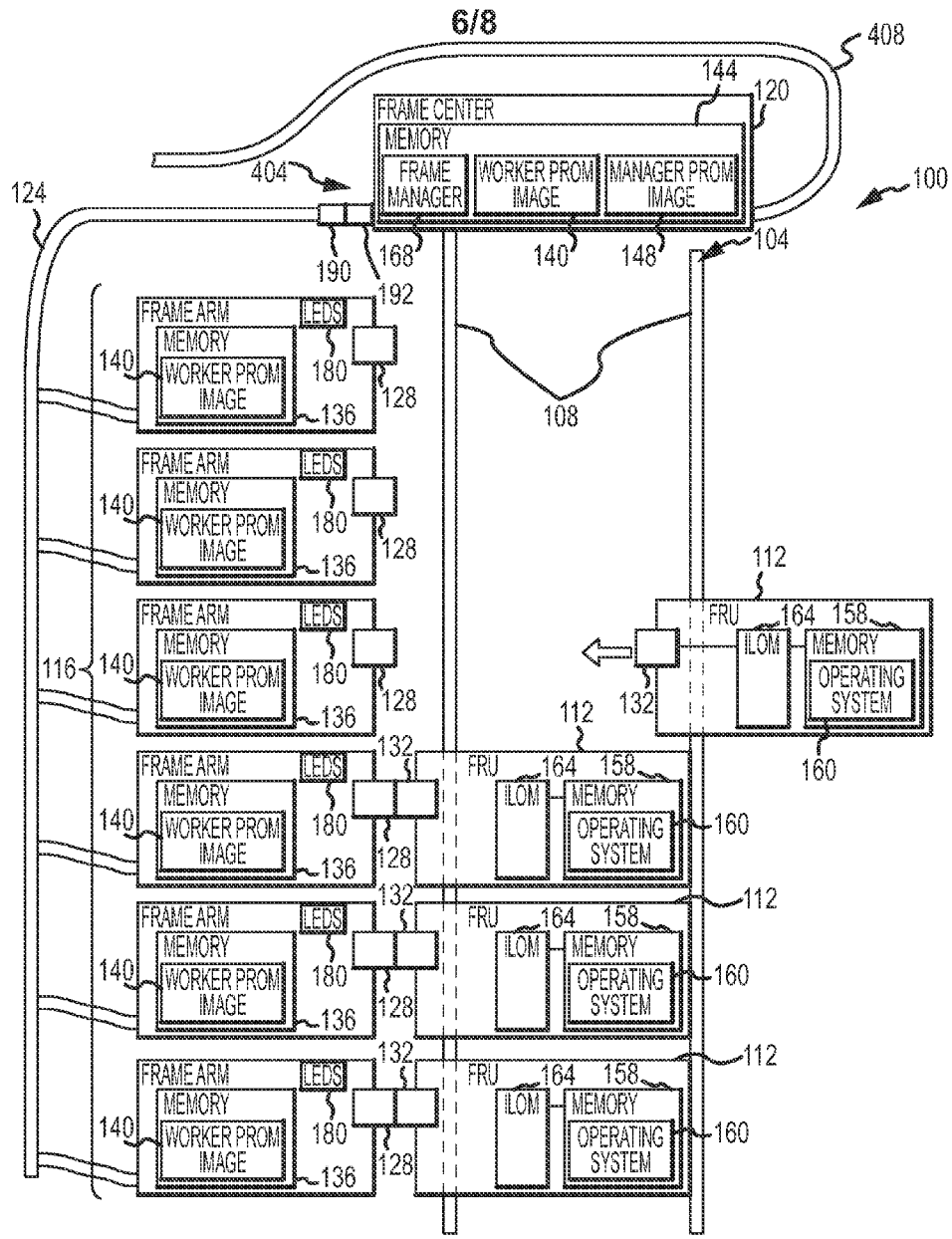

FIGS. 5 and 6 illustrate other embodiments of the frame 100. As discussed previously, FIG. 5 illustrates an embodiment in which the connector 132 of a FRU 112' in the form of a blade enclosure or chassis is interfaced with the connector 128 of a corresponding frame arm 116, and the FRU 112' includes a plurality FRUs 112" in the form of blade servers appropriately mounted within the FRU 112'. FIG. 6 illustrates a smart frame system 399 in which first and second 400, 404 frames (e.g., frames 100) respectively installed within first and second racks 104 may be interconnected by any appropriate communication channel(s) or interconnect 408 for use in increasing processing and memory capacity. In this arrangement, a single frame manager 168 residing on the frame center 120 or a FRU 112 of either the first or second frame 400, 404 may manage all FRUs 112 installed on the first and second frames 400, 404. That is, one of the first and second frames 400, 404 may be free of a frame manager 168. For instance, communications between a frame manager 168 residing on the first frame 400 and a FRU 112 on the second frame 404 may be passed to the frame center 120 of the second frame 404 which proceeds to analyze the communication (in conjunction with the manager PROM image 168) to determine which FRU 112 the communication is to be routed to.

In one arrangement, the manager PROM image 148 may conform to IPMI Platform Management FRU Information Storage Definition version 1.0. Provided below is one example of a management record specification for use with the frame 100 disclosed herein with the understanding that the present disclosure is not limited to the specific format presented below. Rather, it is only provided as an example to present the reader with one manner in which the present disclosure can be implemented.

Primary Records
Location Record:

| | Location ID | | |
|---|---|---|---|
| Field | Type | Size | Value |
| Sub Record ID | Data | 1 | 0x02 |

| | Record Data | |
|---|---|---|
| Field | Type | Size |
| Location ID | Data | 2 |
| Identification Byte | Data | 1 |
| Rack Location Bottom | Data | 1 |
| Rack Location Height | Data | 1 |
| Frame manager Location ID 1 | Data | 1 |
| Frame Manager Location ID 2 | Data | 1 |
| Start of Subordinate Location ID List | Struct | Variable |

There may exist four types of "Location IDs" in the location record:

| Location ID Range | Location ID Type |
|---|---|
| 0x00.00 | Null Location ID |
| 0x00.01 to 0x00.FD | Physical Location IDs |
| 0x01.00 to 0x0F.FF | Non Physical Location IDs |
| 0x00.FE | Virtual Fame Manager ID |

Each location ID may be two bytes in length and have the following bit definitions:

| Bits 12-16 | Bits 8-11 | Bits 4-7 | Bits 0-3 |
|---|---|---|---|
| Frame ID | Non-Physical | Location ID | |

The "Rack Location" fields may be populated for corresponding Physical Location IDs. The Frame ID may be utilized in multi rack configurations. The "Identification Byte" of the location record may be used to determine role information, and may be used by the frame center during the programming process. The Identification Byte may contain a bit mask with the following definitions:

| Identification Byte Bit Mask | |
|---|---|
| 0x00 | Empty (No Attachement) |
| 0x01 | Frame Manager Bit |
| 0x02 | Worker Bit |
| 0x04 | Blade Server Bit |
| 0x08 | Frame Center Bit |
| 0xF0 | Reserved Bits |

The Frame Manager Bit may not be mutually exclusive. For example, a worker FRU that has Frame Manager functionality in one logical domain (LDOM) and worker functionality in another LDOM may have an Identification Byte value of 0x03 whereas a worker FRU free of Frame Manager functionality may have a value of 0x02.

The Subordinate Location ID List may contain a series of device number-to-Location ID mappings. The list may terminate with a Location ID of zero. This information can be used by an entity FRU (e.g., enclosure or chassis) with subordinate attachment FRUs (e.g., blade servers) so that it can configure its attachments free of having to wait for Frame Manager communication. Software may ensure that these mappings are consistent with a corresponding FRU Configuration Data Record (shown below). If the Frame Manager Location ID is non-zero within the Location Record, then it holds a Location ID of a non-physical Frame Manager (e.g., one not connected directly to a Frame Arm such as a blade within a blade server). If there is no corresponding Frame Manger within this attachment, then the entry has a value of zero.

| Subordinate Location ID List | | |
|---|---|---|
| Field | Type | Size |
| Non Physical Location ID | Data | 2 |
| Device Number | Data | 1 |

Subnet IP Record:

The base management Subnet IP address may be stored in the worker PROM image of each frame arm to provide each FRU's OOB service processor the information it needs to communicate with the Frame Manager. Individual management addresses may be derived by using the Base Management Subnet IP as the network address and the Location ID as the host address. Frame Center software may ensure that a change to this address is propagated to each Frame Arm location as well as the Frame Center Image.

| Base Management Subnet IP Record | | | |
|---|---|---|---|
| Field | Type | Size | Value |
| Sub Record ID | Data | 1 | 0x03 |
| Record Data | | | |
| Field | Type | Size | |
| Base Subnet IP | Data | 4 | |
| Net Mask | Data | 4 | |

Configuration Data Record:

The Configuration Data Record may hold most of the information specific to each Location ID. The Frame Manager may access this data and compare it to the installed FRU. FRU components that are intended to be checked may implement a policy byte that the Frame Manager evaluates to determine what action to take if the component fails to meet a minimum requirement (e.g., not enough memory installed).

| FRU Configuration Data Record | | | |
|---|---|---|---|
| Field | Type | Size | Value |
| Sub Record ID | Data | 1 | 0x04 |
| Record Data | | | |
| Field | Type | Size | |
| Location ID | Data | 2 | |
| Parent Location ID | Data | 2 | |
| Device Number | Data | 1 | |
| Number of I/O port records | Data | 1 | |
| Hot Swap Policy | Data | 1 | |

Frame Arm Address Record:

The Frame Arm Address Record maps physical hardware addresses and port numbers to Frame Arm Identifier (e.g., Location IDs). It may be referenced by the Frame Center. This record may include a list of structures that terminating with a Frame Arm identifier of zero.

| Frame Arm Hardware Address Map | | | |
|---|---|---|---|
| Field | Type | Size | Value |
| Sub Record ID | Data | 1 | 0x07 |
| Record Data | | | |
| Field | Type | Size | |
| Frame ID | Data | 1 | |
| Start of Address Map List | Structure | Variable | |

The Address Map List may include a series of Location IDs to hardware address map associations. The list may terminate with a Location ID of zero.

| Address Map List Structure | | |
|---|---|---|
| Field | Type | Size |
| Frame Arm ID (Physical Location ID) | Data | 2 |
| I2C Expander Address | Data | 1 |
| I2C Expander Port Number | Data | 1 |

Optional Records

FRU I/O Port Definition Record:

The FRU I/O Port Definition Record describes each I/O port for a given Location Record. These descriptions may be used in Point to Point Connection Records (discussed below) and may span multiple records to account for FRUs with many ports. The FRU I/O Port Definition Record will have the following specifics:

| FRU I/O Port Definition Record | | | |
|---|---|---|---|
| Field | Type | Size | Value |
| Sub Record ID | Data | 1 | 0x05 |
| Record Data | | | |
| Field | Type | Size | |
| Location ID | Data | 2 | |
| I/O Port Record Number | Data | 1 | |
| Start of I/O Port List | Structure | Variable | |

The I/O Port List may contain a series of port ID to port type associations. Port IDs may be unique to a given Location ID. The port list for the specific record number may terminate with a port ID of zero.

| I/O Port List | | |
|---|---|---|
| Field | Type | Size |
| Port ID | Data | 2 |
| I/O Port Type | Data | 1 |
| I/O Port Number | Data | 2 |

Point to Point Connection Record:

The Point to Point Connection Record defines all I/O port interconnects within a frame. Each connection entry may contain a policy byte that the Frame Manager may use to determine whether a connection should be verified and what action to take if the connection verification fails.

Point to Point Connection Record

| Field | Type | Size | Value |
|---|---|---|---|
| Sub Record ID | Data | 1 | 0x06 |

Record Data

| Field | Type | Size |
|---|---|---|
| Connection Record Number | Data | 1 |
| Start of Connection List | Structure | Variable |

The Connection List may contain a series of connection records with point to point associations. For a given record, the Connection List may terminate with a Connection ID of 0. Software may ensure that all Point to Point connection records are evaluated.

Connection List Structure

| Field | Type | Size |
|---|---|---|
| Connection ID | Data | 2 |
| Location ID A | Data | 2 |
| Port ID A | Data | 2 |
| Location ID B | Data | 2 |
| Port ID B | Data | 2 |
| Policy Byte | Data | 1 |

Dynamic Management Data

Dynamic Management Data may be used by the management framework, and may be considered dynamic in that it may change more frequently than the configuration. The Dynamic Management Data may be held in Frame Manager configuration files rather than PROM images.

Dynamic FRU Configuration Data

| Field | Type | Size |
|---|---|---|
| Location ID | Data | 1 |
| Type Identifier | Data | 1 |
| Type Policy | Data | 1 |
| Product Description String Offset | String | variable |
| Memory Requirement (in MB) | Data | 4 |
| Memory Check Policy | Data | 1 |
| Firmware Requirement List Offset | String List | 1 |
| Firmware Component | String | variable |
| Policy Byte | Data | 1 |

Policy Byte Definitions

| Bit Mask | Installed Type | Memory Size | Firmware | PtoP Connection | Hot Swap |
|---|---|---|---|---|---|
| 0x00 | No Check | No Check | No Check | No Check | Disabled |
| 0x01 | Type | Minimum | Minimum | Check | Activation |
| 0x02 | Architecture | Reserved | Reserved | Reserved | Deactivation |
| 0x04 | Model | Reserved | Reserved | Reserved | Reserved |
| 0x08 | Reserved | Exact | Exact | Reserved | Reserved |
| 0x10 | Warn | Warn | Warn | Warn | Warn |
| 0x20 | Disable App | Disable App | Disable App | Disable App | Reserved |
| 0x40 | Reserved | Reserved | Auto Upgrade | Reserved | Reserved |
| 0x80 | No Activation | No Activation | No Activation | No Activation | Reserved |

Type Identifier and Port Type List

| Value | FRU Type |
|---|---|
| 0x00 | NULL Type |
| 0x10 | RMS |
| 0x11 | RMS: SPARC |
| 0x12 | RMS: x86 |
| 0x20 | Switch |
| 0x21 | Switch: Fast Ethernet |
| 0x22 | Switch: Gigabit Ethernet |
| 0x23 | Switch: 10 Gigabit Ethernet |
| 0x24 | Switch: 40 Gigabit Ethernet |
| 0x28 | Switch: Infiniband |
| 0x30 | Storage |
| 0x31 | Storage: SCSI |
| 0x32 | Storage: SAS |
| 0x40 | Blade Server |
| 0x41 | Blade: SPARC |
| 0x42 | Blade: X86 |
| 0x62 | USB |
| 0xC0 | PDU |

Figure 7:
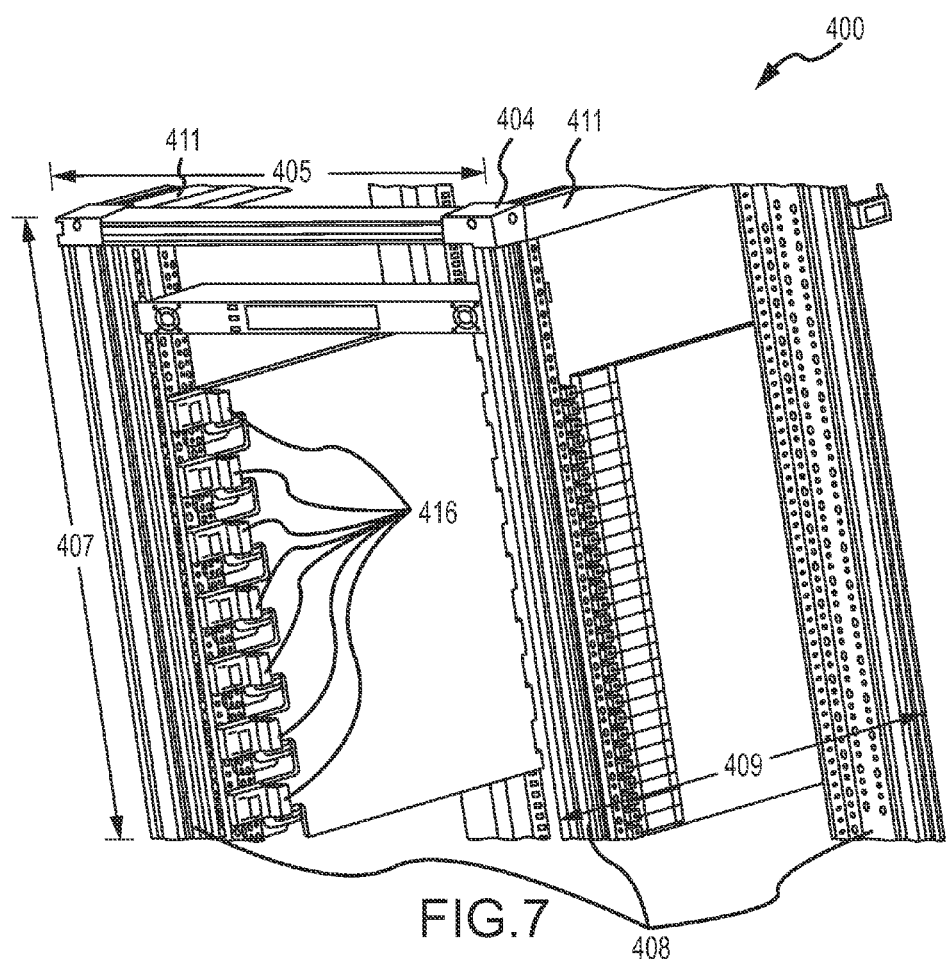
FIG. 7 is a perspective view of another embodiment of a smart computing frame.
Figure 8:
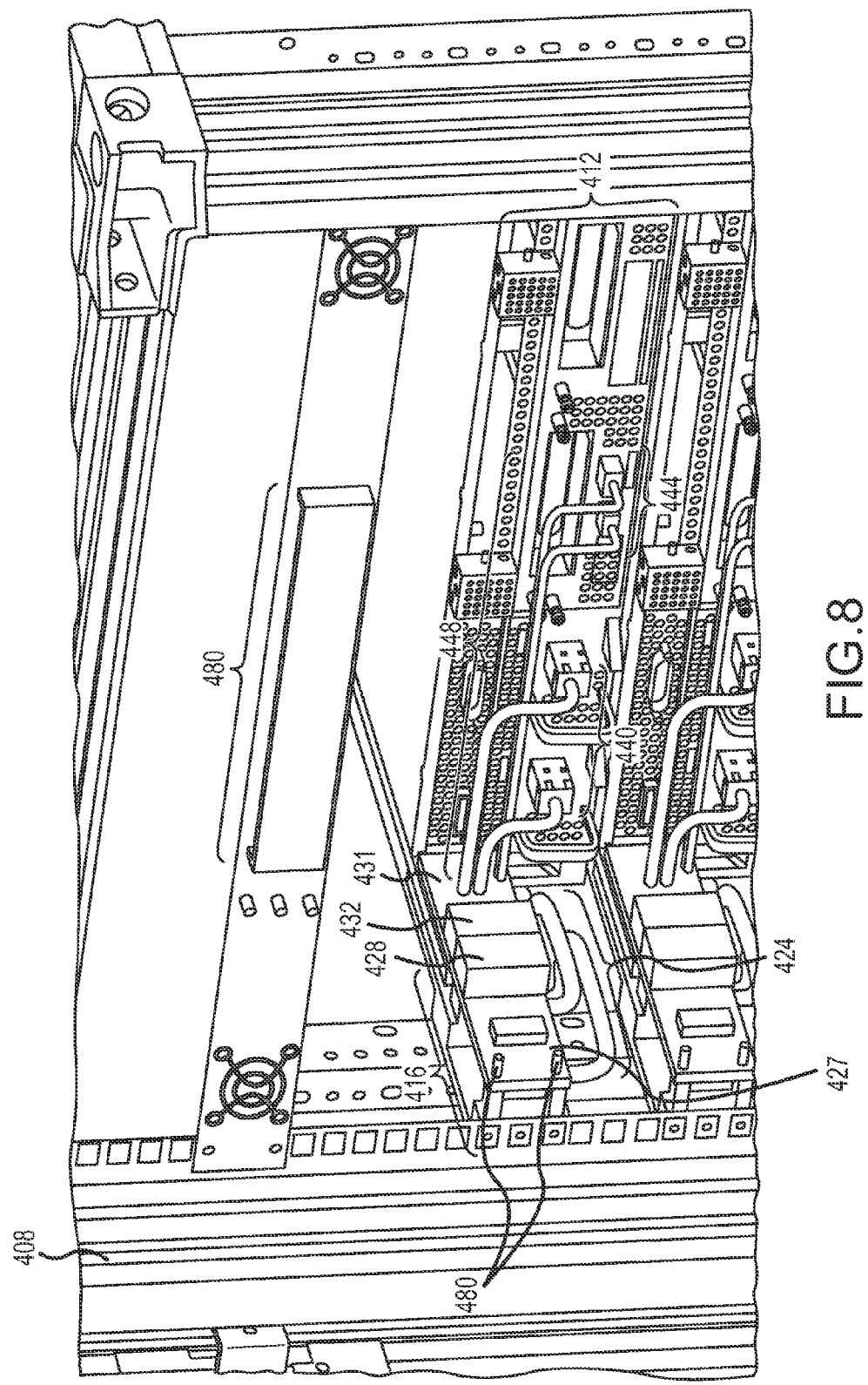
FIG. 8 is a close-up view of a portion of FIG. 7 and illustrating the interconnection between a frame arm and a FRU of the frame.

Turning now to FIGS. 7-8, one arrangement of a smart computing frame 400 (e.g., frame 100) is illustrated that may be used to efficiently manage a wide variety of FRUs such as rack-mount servers, backup power modules, and/or the like. As shown, the frame 400 may be installed or otherwise disposed within a rack or cabinet 404 including width, height and depth dimensions 405, 407, 409 and generally made up a plurality of vertical support members or rails 408 that are interconnected by a plurality of horizontal support members 411. The cabinet 404 may generally have a plurality of receiving locations or bays (not labeled) disposed along the height dimension 407 (or other dimension) for receiving respective FRUs. While not shown, each of the receiving locations may include slide rails or other features that facilitate the alignment and installation of a FRU into the receiving location.

The frame 400 may include a plurality of receiving structures or frame arms 416 respectively corresponding to the plurality of receiving locations (e.g., disposed along the height dimension 407 of the cabinet 404). As shown, each frame arm 416 may be aligned with a corresponding receiving location of the cabinet 404 (e.g., at the rear or other appropriate location of the cabinet 404) so that upon installation of a FRU into a receiving location, the FRU is operable to automatically interconnect with the frame arm 416.

Turning now to FIG. 8, a close-up perspective view of the frame 400 illustrates the interconnection between a FRU 412 and a frame arm 416. The frame arm 416 may include a bracket or circuit board 427 appropriately fixed or otherwise secured to a portion of the cabinet 404 along with a connector 428 (e.g., blind-mate connector) electrically fixed to the circuit board 427. Appropriate portions of a fixed interconnect topology 424 (e.g., power lines, communication lines, LED controls, and the like) secured to a frame center (not shown) may be electrically secured to the circuit board 427 and thereby electrically interconnected to the connector 428. In one arrangement, the circuit board 427 may include memory (e.g., with PROM images), circuitry for use in I$^2$C protocol translation, LEDs, and the like.

Similarly, the FRU 412 may also include a bracket or circuit board 431 secured thereto along with a corresponding connector 432 electrically fixed to the circuit board 431. One or more power ports 440 and one or more communication ports 444 of the FRU 412 may each be electrically interconnected to the circuit board 431 and thereby the connector 432 via a corresponding number of cables, wires and/or the like 448. In this regard, interconnection of the connectors 432 and 428 as shown in FIG. 8 allows the FRU 412 to join the management service context of the frame 400 (e.g., assuming the frame 400 is configured to allow the FRU 412 to join the management service context of the frame 400). The frame 400 may include one or more various LEDs 480 (and/or other indicators) that indicate various operating statuses of the FRUs 412. While not shown, the frame 400 may incorporate other types of ports and connections such as RJ45 connections and the like.

It will be readily appreciated that many additions and/or deviations may be made from the specific embodiments disclosed in the specification without departing from the spirit and scope of the invention. The illustrations and discussion herein has only been provided to assist the reader in understanding the various aspects of the present disclosure. For instance, while the frame center 120 has been disclosed as generally facilitating communications (e.g., as a switch) between the FRUs 112 in relation to out of band management, another switch (e.g., InfiniBand) may be provided to facilitate communications between the FRUs 112 and devices or networks outside of the frame 100. That is, while the FRUs 112 may be interconnected to the frame center 120 (e.g., via interfacing of connectors 128, 132) for OOB management of the FRUs 112, the FRUs 112 may also be appropriately interconnected to an InfiniBand or other type of switch for other types of communications and/or data transfers (e.g., video-conferencing traffic). In another embodiment, more than one frame manager may exist within the frame. For instance, while the frame center 120 may run a frame manager for OOB management of FRUs (e.g., in relation to powering up, hot-swapping, and the like), one of the FRUs 112 may run another frame manager that administers higher level managerial tasks within the frame 100.

Furthermore, one or more various combinations of the above discussed arrangements and embodiments are also envisioned. For instance, while FIG. 6 illustrates each of the first and second frames 400, 404 being in the form of frame 100, at least one of the first and second frames 400, 404 could be in the form of the frame 100' of FIG. 5 whereby a FRU 112' in the form of an enclosure of chassis includes a plurality of FRUs 112" in the form of blade servers.

Embodiments disclosed herein can be implemented as one or more computer program products, i.e., one or more modules of computer program instructions encoded on a computer-readable medium for execution by, or to control the operation of, data processing apparatus. For example, the frame manager 168 may be provided in such computer-readable medium of the frame center 120, one of the FRUs 112, and/or the like, and executed by a processor or processing engine (not shown) of the FRU 112. As another example, the logic or software of the frame center 120 responsible for accessing the manager PROM image 148 and routing communications within the frame 100 may be provided in such computer-readable medium of the frame center 120 (e.g., memory 144) and executed by a processor or processing engine (not shown) of the frame center 120 (not shown). The computer-readable medium can be a machine-readable storage device, a machine-readable storage substrate, a non-volatile memory device, a composition of matter affecting a machine-readable propagated signal, or a combination of one or more of them. In this regard, the frame 100 may encompass one or more apparatuses, devices, and machines for processing data, including by way of example a programmable processor, a computer, or multiple processors or computers. In addition to hardware, the frame 100 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., managing FRUs 112, routing communications, and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A system for use with hot-pluggable, field replaceable units (FRUs), comprising:
    a plurality of receiving structures for interfacing with a corresponding number of FRUs, wherein each receiving structure is in a fixed, physical location within the system relative to other ones of the plurality of receiving structures, wherein a first of the receiving structures is adapted to interface with a first FRU of a first type, wherein a second of the receiving structures is adapted to interface with a second FRU of a second type, and wherein the first type is different than the second type;
    a central management server for performing out of band (OOB) management of FRUs interfaced within the system; and
    a fixed interconnect topology interconnecting the central management server to the plurality of receiving structures, wherein the fixed interconnect topology comprises at least one path interconnecting each receiving structure to the central management server, wherein the central management server obtains data corresponding to a first fixed, physical location of the first receiving structure by way of a first path interconnecting the central management server to the first receiving structure, wherein the central management server utilizes the first fixed, physical location data to perform OOB management of a FRU interfaced with the first receiving structure via the fixed interconnect topology, and wherein the central management server performs the OOB management of the FRU interfaced with the first receiving structure by evaluating one or more properties of the FRU in relation to one or more reference properties of any FRU to be installed at the first fixed, physical location within the system.

2. The system of claim 1, wherein each of the first and second FRU types are selected from FRU manufacturers and/or FRU form factors.

3. The system of claim 1, wherein the at least one path interconnecting each receiving structure to the central management server comprises:
    at least one power line interconnecting receiving structure to the central management server; and
    at least one communication line interconnecting the receiving structure to a respective network port on the central management server.

4. The system of claim 3, wherein each receiving structure comprises a connector, wherein the at least one power line and the at least one communication line are fixed to the connector, and wherein the connector is adapted to interface with a corresponding connector of a FRU.

5. The system of claim 4, wherein the connectors comprise blind-mate connectors.

6. The system of claim 3, wherein the power and communication lines of all of the receiving structures are directly connected to a harness connector, and wherein interfacing of the harness connector with a corresponding connector on the central management server interconnects power and communication lines to the central management server.

7. The system of claim 1, wherein each receiving structure comprises a memory including at least a first programmable read-only memory (PROM) image, wherein the receiving structure PROM image includes a location record that has the fixed, physical location data of the receiving structure.

8. The system of claim 7, wherein the central management server comprises a memory including at least a first PROM image that includes the location records for each of the interfaced FRUs, and wherein the central management server utilizes the location records in the central management server PROM image to perform the out of band management of the interfaced FRUs.

9. The system of claim 1, wherein the at least one path interconnecting each receiving structure to the central management server comprises at least one cable, wherein each cable comprises a memory including fixed, physical location data of a corresponding receiving structure, and wherein the central management server reads the fixed location data from the at least one cable to determine a fixed, physical location of a FRU interfaced with the receiving structure.

10. The system of claim 1, wherein each receiving structure comprises at least one indicator that is operable to indicate a status of a FRU interfaced with the receiving structure.

11. The system of claim 10, wherein the at least one indicator comprises a light-emitting diode (LED).

12. A combination, comprising:
    the system of claim 1; and
    a cabinet; wherein the receiving structures, the central management server and the fixed interconnect topology are all physically integrated into the cabinet.

13. The combination of claim 12, wherein the cabinet comprises width, height and depth dimensions; wherein the receiving structures are disposed in the cabinet along the height dimension; and wherein each receiving structure is spaced from other receiving structures by multiples of one rack unit (U).

14. A setup, comprising:
    a cabinet comprising width, height, and depth dimensions, wherein the cabinet includes a plurality of vertical support members extending along the height dimension, wherein the cabinet includes a plurality of horizontal support members extending along at least one of the width and depth dimensions, and wherein the plurality of vertical support members are interconnected to the plurality of horizontal support members;
    a plurality of receiving structures situated along the height dimension of the cabinet, wherein each receiving structures comprises a first connector;
    a central management server fixed to the cabinet; and
    a harness of communication paths interconnecting the central management server to the first connectors, wherein the harness of communication paths comprises at least one power cable interconnected between the central management server and each first connector and at least one communication cable interconnected between the central management server and each first connector, wherein the central management server performs out of band (OOB) management of field replaceable units (FRUs) interfaced with the first connectors via the harness of communication paths, and wherein the central management server performs the OOB management of FRUs interfaced with each of the receiving structures by evaluating one or more properties of FRUs interfaced with the receiving structure in relation to one or more reference properties of any FRU to be installed at the receiving structure.

15. The setup of claim 14, further comprising a plurality of FRUs installed in respective receiving locations in the cabinet, where each FRU comprises:
    a second connector;
    at least one power port;

at least one network port; and communication paths interconnecting the power and network ports to the second connector, wherein the second connector is interfaced with the first connector of the respective receiving location.

16. The setup of claim 15, where the plurality of FRUs comprises a first FRU of a first type and a second FRU of a second type, and wherein the first type is different than the second type.

17. The setup of claim 16, wherein each of the first and second FRU types are selected from FRU manufacturers and/or FRU form factors.

18. A method, comprising:

ascertaining, by a central management server interconnected to a computing cabinet, that at least a first field replaceable unit (FRU) has been installed on a first of a plurality of receiving structures interconnected to the computing cabinet;

establishing a connection with an out of band (OOB) service processor of the first FRU via a fixed interconnect topology, wherein the fixed interconnect topology interconnects the central management server to each of the plurality of receiving structures;

obtaining, from the OOB service processor of the first FRU, one or more properties of the first FRU;

evaluating the first FRU properties in relation to one or more persistently stored expected properties of FRUs installed at the first receiving structure; and taking, by the central management server, at least one action based on a result of the evaluating.

19. The method of claim 18, wherein the result of the evaluating comprises validation of the first FRU properties, and wherein the taking comprises:

instructing a processor on a motherboard of the first FRU to power up.

20. The method of claim 18, further comprising:

receiving, at the central management server, a request to perform a hot-swap operation of a second FRU installed at a second receiving structure in the computing cabinet;

evaluating the management record portion to determine whether a hot-swap operation of the second FRU at the second receiving structure is allowed or disallowed; and proceeding to allow or disallow the hot-swap operation based on a result of the evaluating.

* * * * *

UNITED STATES PATENT AND TRADEMARK OFFICE
CERTIFICATE OF CORRECTION

| | | |
|---|---|---|
| PATENT NO. | : 8,874,817 B2 | Page 1 of 1 |
| APPLICATION NO. | : 13/368528 | |
| DATED | : October 28, 2014 | |
| INVENTOR(S) | : Delfatti, Jr. et al. | |

It is certified that error appears in the above-identified patent and that said Letters Patent is hereby corrected as shown below:

On title page, column 2, under Attorney, Agent or Firm, line 2, delete "Jonathan" and insert -- Jonathon --, therefor.

In the Specification

In column 16, line 48 (in Table), delete "Attachement" and insert -- Attachment --, therefor.

Signed and Sealed this
Thirtieth Day of June, 2015

Michelle K. Lee
*Director of the United States Patent and Trademark Office*